March 31, 1925.
G. L. E. KLINGBEIL
1,531,289
SPRING SPREADER
Filed March 17, 1924.   2 Sheets-Sheet 1
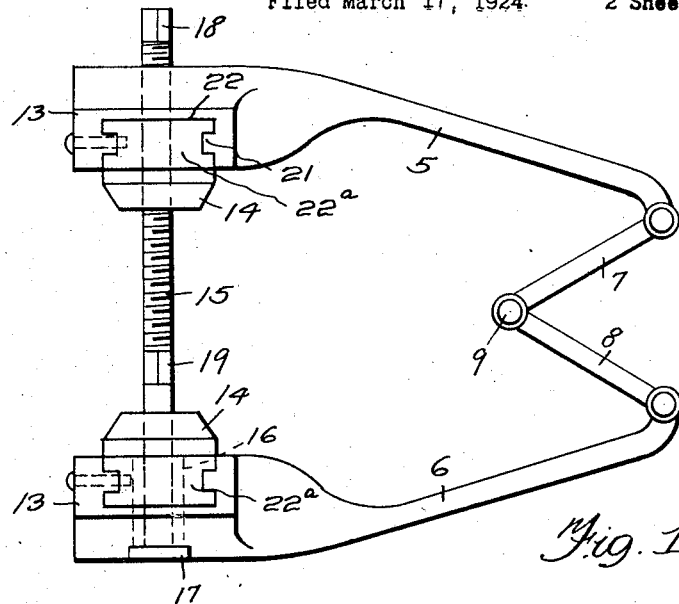
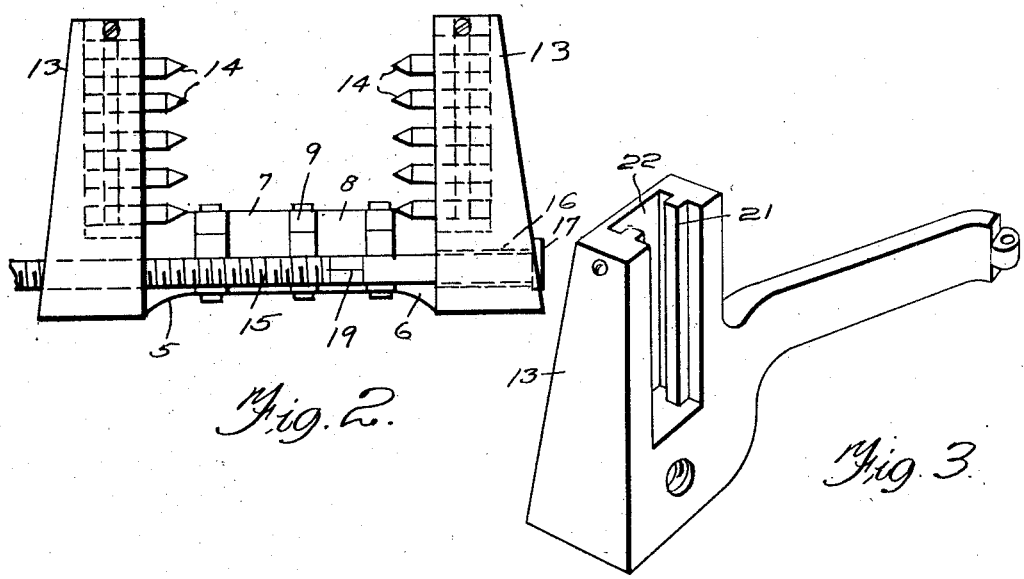
Inventor
G. L. E. Klingbeil,
By Samuel Herrick,
Attorney

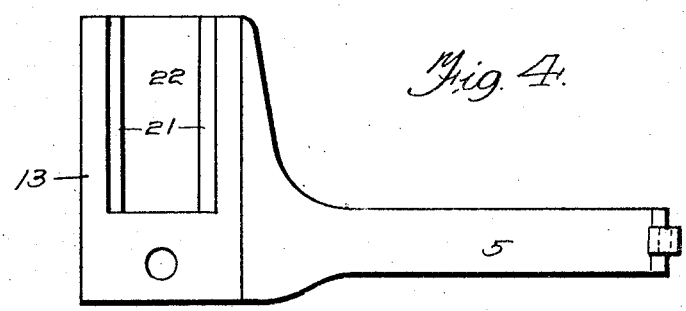
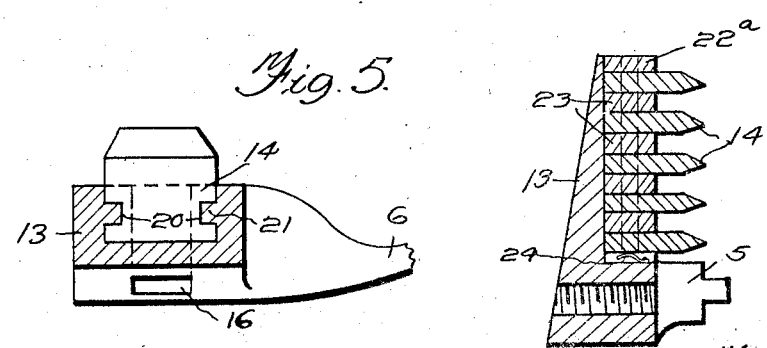
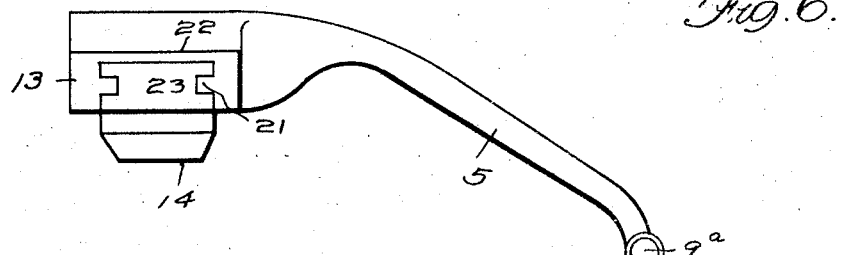
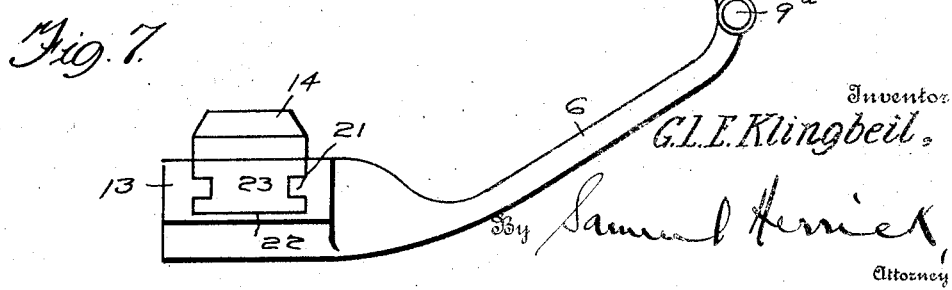

Patented Mar. 31, 1925.

1,531,289

UNITED STATES PATENT OFFICE.

GOTTLIEB L. E. KLINGBEIL, OF OMAHA, NEBRASKA.

SPRING SPREADER.

Application filed March 17, 1924. Serial No. 699,757.

*To all whom it may concern:*

Be it known that GOTTLIEB L. E. KLINGBEIL, a citizen of the United States, residing at Omaha, in the county of Douglas and State of Nebraska, has invented certain new and useful Improvements in Spring Spreaders, of which the following is a specification.

This invention relates to spring spreaders and it has for its object to provide a device of simple and inexpensive construction by means of which the leaves of vehicle springs and particularly automobile springs may be separated enough to permit of the insertion of lubricant therebetween. It is a well recognized fact that most of the squeak and much of the hard riding of automobiles is due to lack of sufficient lubrication of the leaves of the vehicle springs.

It is now largely the practice to separate the leaves one at a time by driving a screw driver or like tool therebetween. The primary object of the present invention is to provide a simple hand tool by means of which all the leaves of the springs may be separated simultaneously, so that the work of inserting a lubricant will be expedited, and this irrespective of the width of the leaves or their thickness.

Further objects and advantages of the invention will be set forth in the detailed description which follows.

In the accompanying drawing;

Fig. 1 is a plan view of a spring spreader constructed in accordance with the invention.

Fig. 2 is an end view thereof.

Fig. 3, is a perspective view of one of the jaws, hereinafter described.

Fig. 4 is an inside face view of said jaw.

Fig. 5 is a horizontal sectional view through one of the jaws.

Fig. 6 is a longitudinal sectional view through one of the jaws.

Fig. 7 is a view like Fig. 2 but illustrating a modified form of hinge joint between the jaws.

Like numerals designate corresponding parts in all of the figures of the drawings.

The spring spreader of the present invention comprises a pair of jaws 5 and 6. In the preferred embodiment of the invention the rear ends of these jaws are pivotally connected to links 7 and 8 which links are, in turn pivotally connected to each other at 9. Thus the jaws are hingedly connected to each other but may remain in substantial parallelism with each other as they are moved toward and from each other.

The structure illustrated in Fig. 6 is like that illustrated in Fig. 1 except that the links 7 and 8 are omitted and a simple hinge connection is substituted at 9$^a$.

Each of the jaws carries an upright leg 13 which lies substantially at right angles to the main body portion of the jaw. These legs 13 receive banks of wedges 14, the ends of which enter between the leaves of the vehicle spring when the jaws are moved toward each other and under the influence of a screw 15. One end of this screw fits loosely in a slot, 16 formed in one of the jaws, at its juncture with the corresponding leg and a headed portion 17 of the screw lies outside of the leg. The other end of the screw has threaded engagement with the other jaw and the screw is provided with angular portions 18 and 19 for the reception of a suitable wrench, or other tool, by which it may be turned.

By referring to Fig. 5 it will be seen that the wedges 14 are provided with notches 20 in their opposite edges and these notches engage ribs 21 which project inwardly from the opposite sides of the vertically slotted portions 22, of the legs. Shims 23 are disposed between the wedges and suitably space the wedges apart. By utilizing shims of different thickness the wedges may be spaced apart to any desired degree to accommodate the particular thickness of the leaves of the spring being operated upon.

After the wedges have been slipped into place, closure plates 22$^a$ are inserted in the upper ends of the slots 22 of the legs and are secured in place by screws 23. If desired springs 24 may be disposed at the lower ends of the vertical, slotted portions of the legs for the banks of wedges to rest upon, whereby the banks of wedges as a whole will be more or less floatingly mounted so that they will seek that position where they will most readily enter between the leaves of the spring as the jaws are forced toward each other under the action of the screw 15.

It is sometimes the case that the space between the spring and the body of the vehicle is so small as to prevent the insertion of a bank of wedges between the spring and body. In such cases the bank of wedges may be omitted from one of the jaws and this element may be used as a mere backing up element during the time that the other jaw with its bank of wedges is being forced into position to cause said wedges to enter between the leaves of the spring.

It will be seen that the jaws 5 and 6 hold the legs in assembled relation with respect to each other, leaving the sole duty of the screw to draw the jaws forcibly toward each other. By turning the screw in such direction as to permit separation of the jaws, the tool is brought to such condition that the jaw 6 may be moved, to a limited extent freely along the bolt. With the jaws moved to position of farthest separation the tool may be placed in such position that the banks of wedges lie upon the opposite sides of a spring, the leaves of which are to be separated. Then by turning the screw in the other direction the jaws will be forced toward each other and banks of wedges will be forced between the leaves of the spring in a way which will be readily understood.

It is to be understood that the invention is not limited to the precise construction set forth, but that it includes within its purview whatever changes fairly come within either the terms or the spirit of the appended claims.

Having described my invention what I claim is:

1. A spring spreader comprising a pair of hingedly connected jaws, a pair of legs disposed substantially at right angles thereto, and having vertical slots formed therein, banks of wedges floatingly mounted in each of said slots, and means for drawing said legs forcibly toward each other.

2. The combination with a pair of hingedly connected horizontally disposed jaws of a pair of vertically disposed legs carried thereby, each of said legs having a slot formed vertically therein which opens at the inner face of said legs, a screw for drawing said legs forcibly toward each other and a bank of wedges in each of said slots.

3. A spring spreader comprising a pair of hingedly connected jaws, a pair of legs one carried by each of said jaws, said legs being disposed substantially at right angles to said jaws and having longitudinal slots formed therein which open at the inner faces of said legs, ribs projecting from the opposite sides of said slots, wedges engaged with said ribs, means for spacing said wedges apart and means for floatingly mounting said wedges.

4. A structure as recited in claim 3 in combination with a screw loosely engaged in one of said legs and having threaded engagement with the other of said legs.

5. A structure as recited in claim 1 wherein the means for drawing said legs together comprises a screw having loose engagement with one of said legs and threaded engagement with the other of said legs.

In testimony whereof he affixes his signature in the presence of two witnesses.

GOTTLIEB L. E. KLINGBEIL.

Witnesses:
ROSE S. FRANKEL,
JNO. N. CRAWFORD.